E. G. PADDECK.
AUTOMATIC WIRE TIER FOR BALING PRESSES.
APPLICATION FILED JUNE 22, 1916.
1,236,752.
Patented Aug. 14, 1917.
4 SHEETS—SHEET 1.
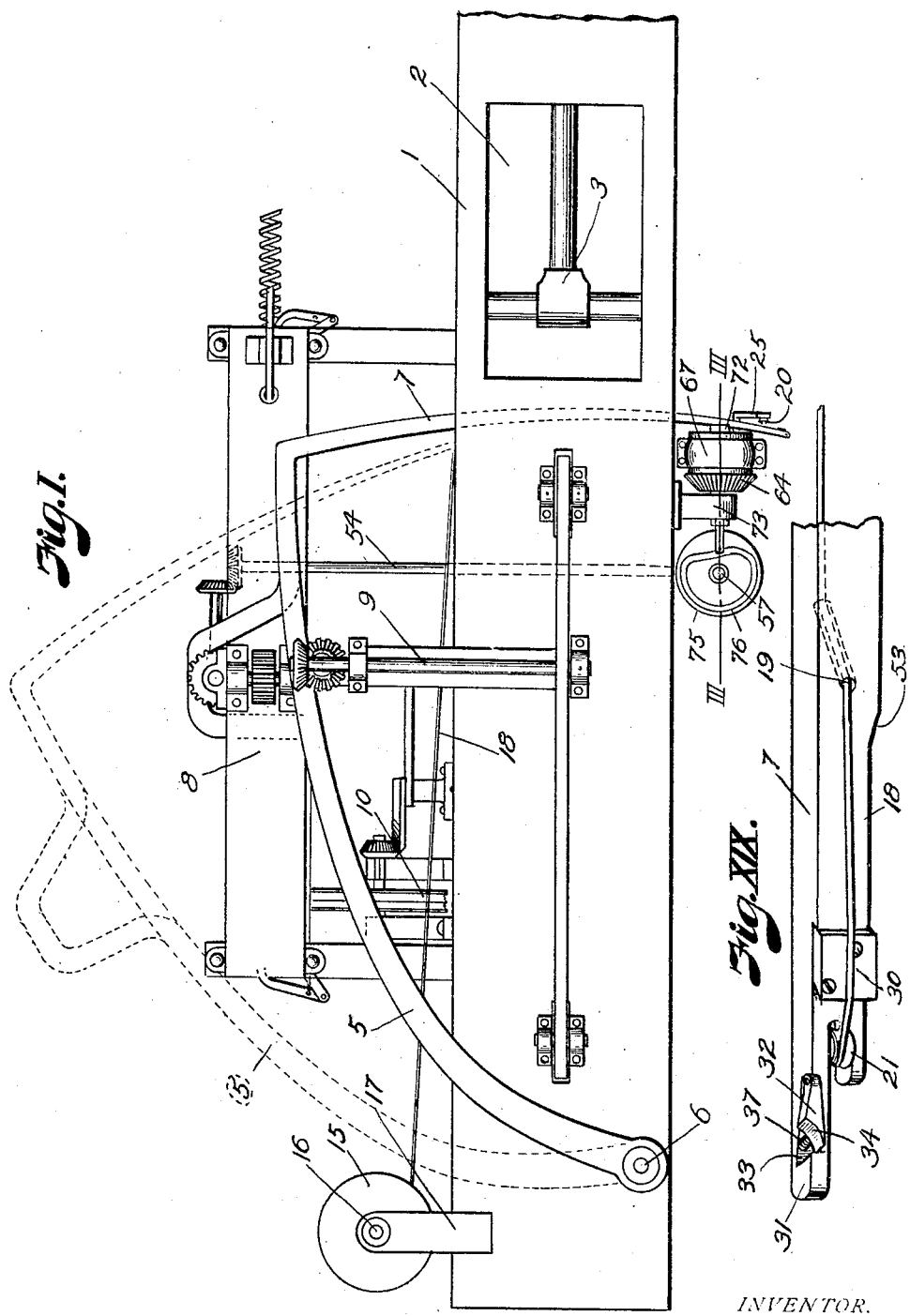
INVENTOR.
Edward G. Paddeck
BY Arthur C. Brown
ATTORNEY

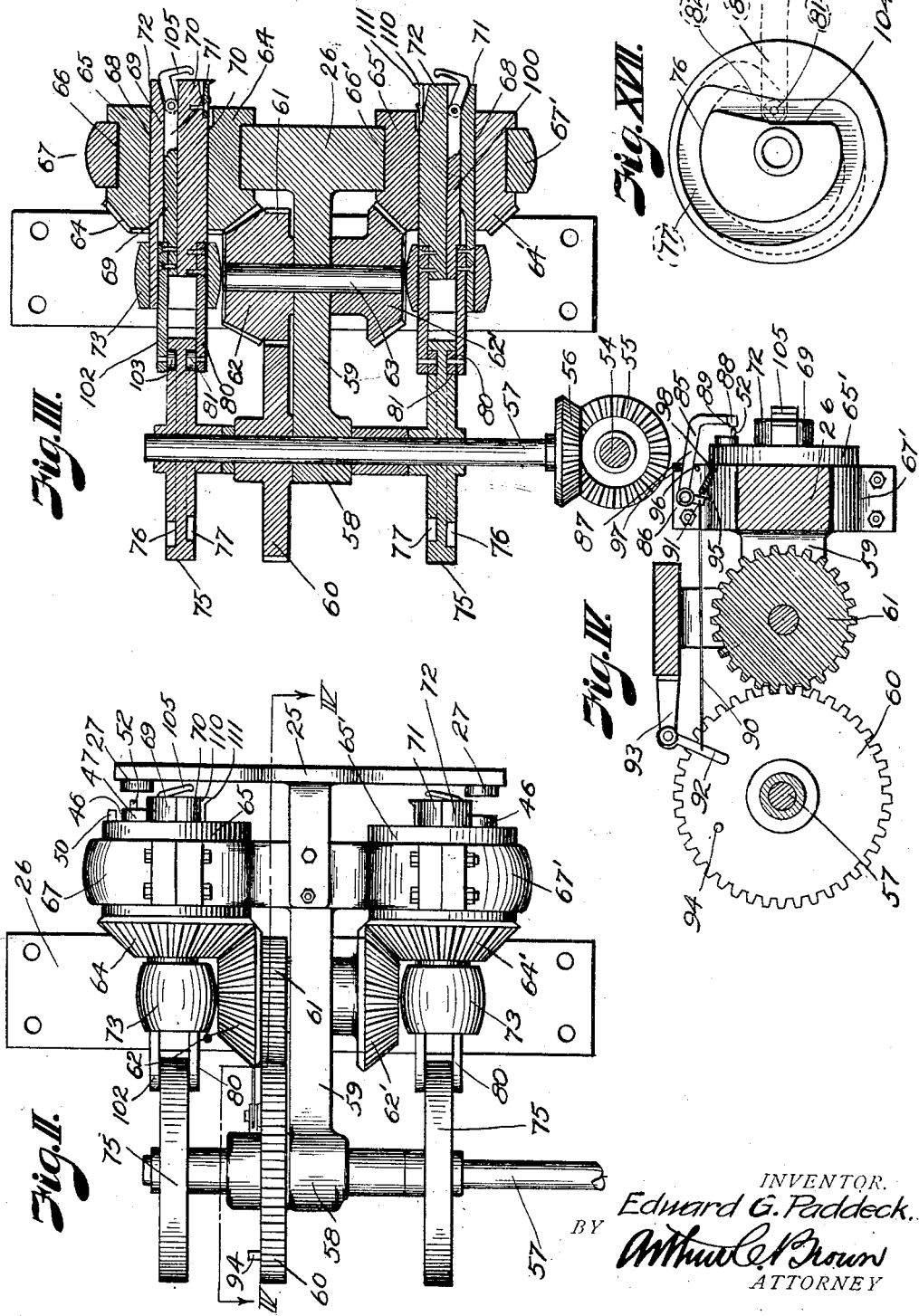

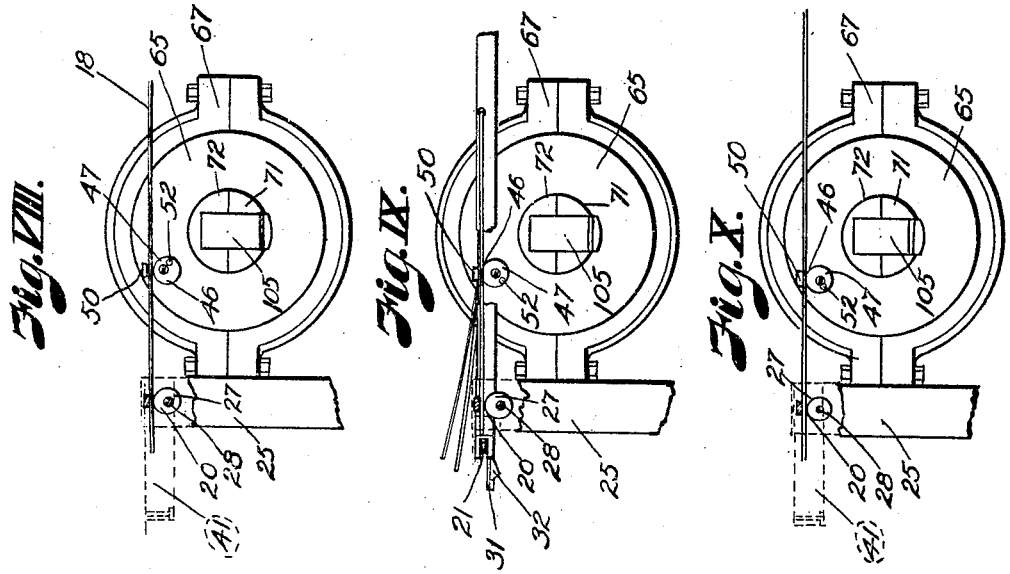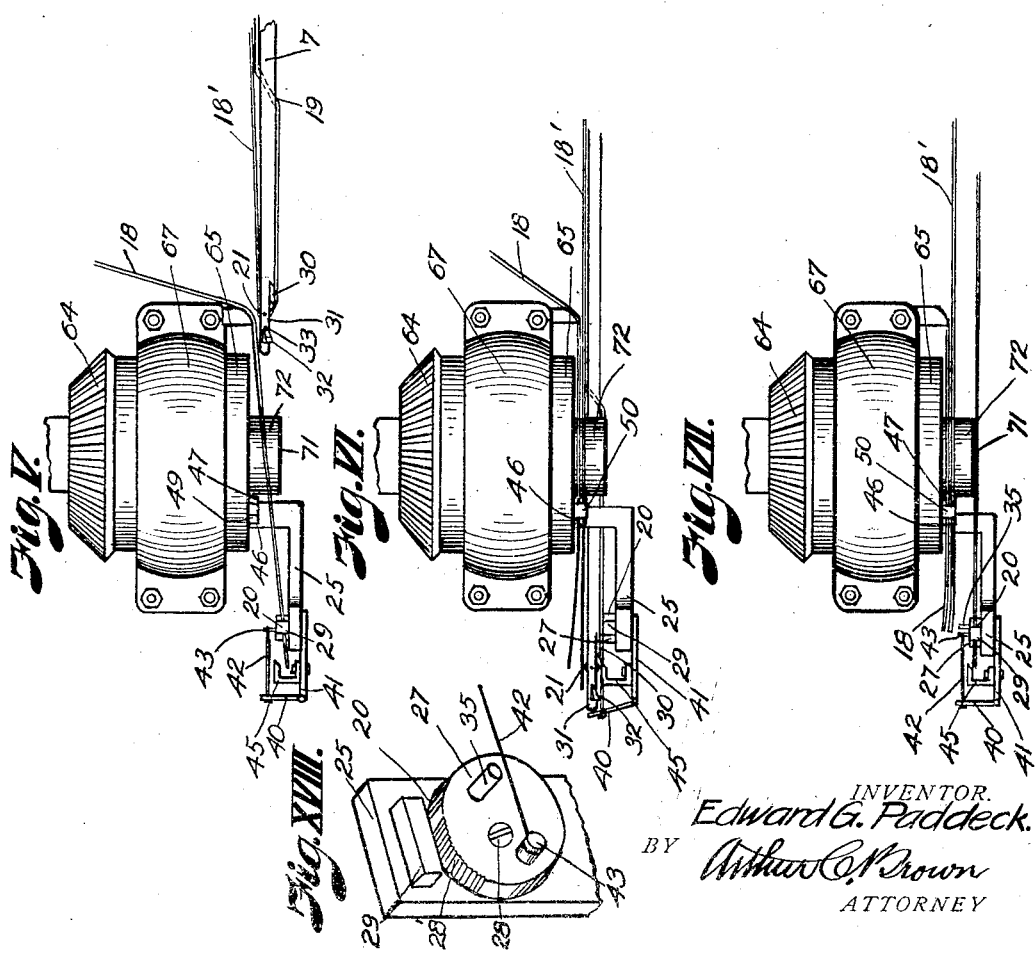

E. G. PADDECK.
AUTOMATIC WIRE TIER FOR BALING PRESSES.
APPLICATION FILED JUNE 22, 1916.
1,236,752.
Patented Aug. 14, 1917.
4 SHEETS—SHEET 4.
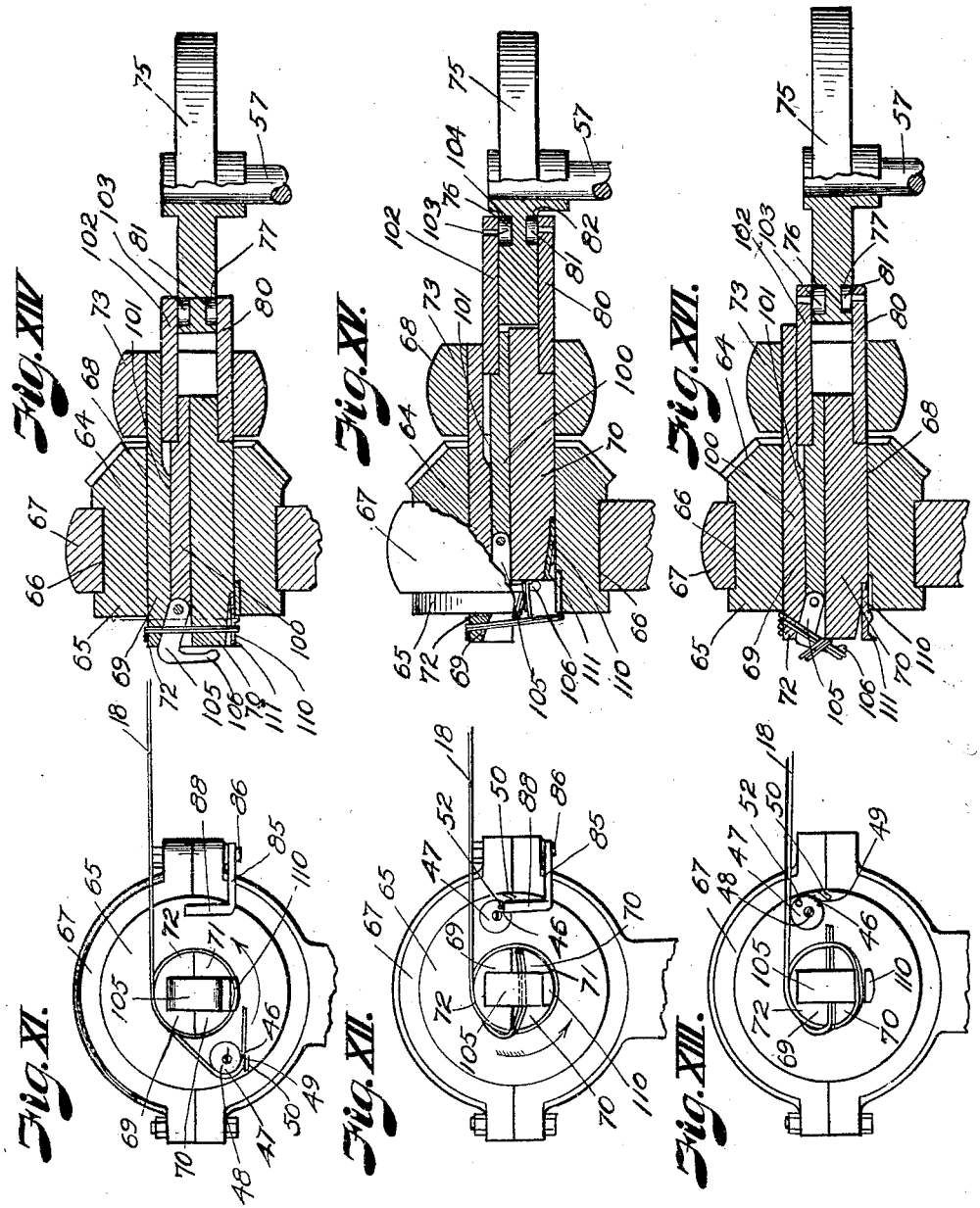
INVENTOR.
Edward G. Paddeck.
BY Arthur C. N. Brown
ATTORNEY

UNITED STATES PATENT OFFICE.

EDWARD G. PADDECK, OF KANSAS CITY, MISSOURI.

AUTOMATIC WIRE-TIER FOR BALING-PRESSES.

1,236,752.

Specification of Letters Patent.

Patented Aug. 14, 1917.

Application filed June 22, 1916. Serial No. 105,170.

*To all whom it may concern:*

Be it known that I, EDWARD G. PADDECK, a citizen of the United States, residing at Kansas City, in the county of Jackson and State of Missouri, have invented certain new and useful Improvements in Automatic Wire-Tiers for Baling-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an automatic bale tier, and has for its principal object to provide apparatus for tying bales of hay, straw, or other material automatically during the baling process.

This object is accomplished by mechanism comprising needles for running wires transversely through the baling case of a press and holding the wires at opposite sides of the case, so that as the bale is pushed forwardly the wires are fed to inclose the bale.

Mechanism operable by the traveling bale is provided for actuating the needle at proper intervals relative to the desired length of the bale and other mechanism provided for taking the wires from the needles and looping the same to tie the wires about the bale.

The preferred form of mechanism for accomplishing the above objects is illustrated in the accompanying drawings, wherein:—

Figure I is a plan view of a part of a press equipped with my tying apparatus showing the needles in projected position.

Fig. II is an enlarged side view of the wire tying mechanism.

Fig. III is a vertical sectional view on the line III—III, Fig. I.

Fig. IV is a horizontal sectional view on the line IV—IV in Fig. II, particularly illustrating a clutch tripping mechanism.

Fig. V is a plan view of the upper wire tying mechanism showing the position of the tying parts and the initial wire strand as the needle advances to draw the secondary strand about the bale.

Fig. VI is a similar view showing the needle in its advanced position with the secondary wire cut and the ends clamped in the wire clutches.

Fig. VII is a similar view showing the needle withdrawn and the position of the bale wires just prior to the tying operation.

Figs. VIII—IX—X are front elevations of Figs. V—VI—VII respectively, particularly illustrating the function of the wire clamps.

Fig. XI is a front view of the upper wire tying mechanism showing the initial looping of the strands.

Fig. XII is a similar view showing the ends of the wire strands drawn across the loop.

Fig. XIII is a similar view illustrating the final movement of the tying mechanism and the releasing of the strands.

Figs. XIV—XV—XVI are sectional views of Figs. XI—XII—XIII respectively, particularly illustrating the cam wheel action and the relative position of the looping and tying parts.

Fig. XVII is a plan view of one of the cam wheels.

Fig. XVIII is a detail perspective view of a wire clamp.

Fig. XIX is a detail perspective view of the end of one of the needles.

Referring more in detail to the drawings—

1 designates the baling case of a hay or other press of an ordinary type comprising the hopper 2 into which the material to be baled is fed, and the plunger 3, whereby the material is forced through the case to effect proper compression of the material and induce the forward feed.

With an ordinary press of this character, the material is tied with suitable wires that extend about the bale and are run transversely through the case and tied by hand. The present apparatus, however, effects the placement of the wire and tying thereof automatically by means of needles and clutches that hold and turn the operating parts in proper sequence and at proper intervals for tying uniform bales, without the use of head-blocks, or division boards.

This mechanism comprises arms 5, which are pivotally mounted at their butt ends on studs 6 at the top and bottom of the baling case 1, and have curved points 7 at their forward ends directed toward the case and are of such length that they may extend entirely therethrough and beyond the side of the case opposite that which they enter.

Mechanism for reciprocating the needles to carry the wire transversely through the case may be of any suitable construction, but preferably comprising a shuttle mechanism indicated at 8 and described in my co-pending application on automatic wire tier for baling press, Serial No. 83950, wherein the shuttle is operated by suitable gearing 9 driven by the movement of a bale through the press and in turn operates winding drums 10 to intermittently reciprocate the needles to carry the wires transversely through the case.

The tie wires for the bales are carried on spools 15 on a shaft 16 carried by plates 17 mounted on the case 1 and carry strands of tie wires 18, which are run forwardly to the needle points 7 and are strung through horizontally and outwardly inclined apertures 19 therein and transversely through the case where they are caught in a clutch 20 hereinafter described in detail.

While I employ two needle points for carrying separate wire strands, so that the bales may be tied adjacent the tops and bottoms of the bales, the mechanism for tying the wire at each needle point is identical with that of the other so but one set will be described in detail with the understanding that the description relates equally to both.

When a wire 18 is run through its needle point aperture it is caught in a clutch 20 and held therein, so that when the needle point is drawn back out of the baling case, the wire is held and lies horizontally across the baling case. With the wire so held, when the hay or other material to be baled is forced forwardly through the case it engages the wire and moves the same backwardly, so that the wire being held in the clutch 20 cannot give, but being free on the spools will pay out from the spools and run over the grooved wheel 21 at the end of the needle point; it being apparent that when the bale is of sufficient length and the needle is again operated the wire is carried back behind the bale, and when tied by the tying mechanism will hold the bale together.

The clutch 20 for holding the free end of the wire is mounted on a bracket 25 secured to the supporting bracket 26 which supports tying gears presently described, and comprises a circular gripping head 27, which is eccentrically pivoted on a stud 28, so that a serrated face 28' thereof is adapted for movement toward and from an outstanding boss 29 integrally formed with the bracket 25; and coöperates therewith to form a clutch.

In order to facilitate clutching of the wire I space the wire from the face of the needle by passing the same over a cutting blade 30 near the end of the needle so that as the needle passes the clutch members the wire strand is carried between the roller or head 27 and the boss 29.

The needle is also provided with an extended portion 31, which carries a trip latch 32 near its end, which is pivotally mounted in a socket 33 in the extension, and has an outwardly facing curved surface 34 adapted for engaging an outstanding stud 35 on the grip head 27 as the needle advances, to move the head on its pivotal mounting and release a wire that is gripped thereby; the latch being so pivoted that as the needle is moved outwardly from the case, the latch will yield against the pressure of a spring 37 and allow the needle to pass the clutch members.

When threading the machine at the starting of a baling operation, the primary strand 18 is threaded through a needle aperture 19, and drawn through the baling case to be caught by an oncoming bale and secured in a clutch 20.

As the needle enters to draw the second-lowing bale. The strand 19' is carried across face 34 of the trip latch 32 engages the stud 35, and turns the grip head to release the primary strand and move it outwardly, so that the strand carried in by the needle may be gripped and held in position for the following bale. The strand 18' is carried across the case as is the primary strand, but is designated secondary because it coöperates with the strand 18 which has been forced ahead with the bale to inclose the bale. This secondary strand carries with it a lapped length of wire which after the tying of one bale becomes the primary tying strand of an oncoming bale.

In order to re-set the grip about the secondary strand after the primary strand has been released I provide a lever 40, which is pivotally carried on an arm 41 extended from the bracket 25, and which lies in the path of the needle, and connected with the lever 40 is a cable 42, which fastens to a stud 43 extending from the clutch head 27 diametrically opposite the stud 35; the parts being so arranged that as a needle advances it passes the clutch 20, releases the primary strand moving it outwardly and the extended portion 31 of the needle engages the lever 40 rocking the same to tighten the cable and revolve the head 27 to effect a new grip on the secondary strand.

The final forward movement of the needle carries the blade 30 on the needle point and over which the wire is run, against a coöperating blade 45 mounted on the arm 41, so that the wire is severed. Following the severance of the wire the needle point moves back out of the baling case, and as the clutch holds the wire the latter is pulled through the needle aperture and lies across the baling case to be advanced by the end of an oncoming bale; the ends of the primary strand and severed secondary strand being held by a clutch 46 on the tying mechanism presently described.

The clutches 46 are similar in construction and operation to the clutches 20, in that they comprise circular heads 47 eccentrically pivoted on studs 48 and have serrated gripping faces 49 for movement toward a boss 50, and coöperate therewith to form a clutch. The clutches 46 normally, or just prior to the advance of a needle are in open position, but as the needle advances to inclose the bale, the primary strand that is held by a clutch 20 and that portion of the secondary strand on the inner face of the needle, are carried between the boss 50 and gripping head 47 and the head is turned on its pivotal mounting to effect a clutch on the strands by means of a pin 52 that extends outwardly from the face of the clutch head as it rides up an incline 53 near the end of the needle point.

The next operation is to fasten the free ends of the wires which inclose the bale and are gripped in the clutch 46. The operation of feeding and clamping the wires has been the same for the upper and lower wires, so that the description given of the actuation of the upper wire has been the same in the lower wire, and the ends of the strands are tied by duplicate sets of mechanism, both of which are operated by action of the shuttle mechanism 8 previously mentioned.

Up to this point all of the operating parts have been driven by the operation of the shuttle mechanism. The tying mechanism is also operated by the final movement of the shuttle, through a cross shaft 54, which extends beneath the case 1, and carries a beveled gear wheel 55, which meshes with a similar gear 56 on a vertical shaft 57 that is revolubly carried in a bearing 58 at the outer end of an arm 59 extended from the bracket 26; the bracket 26 being secured to the side of the baling case, so that the clutches and tying parts will be in proper position to coöperate with the needles to tie the bale.

Adjacent the upper face of the arm 59 and secured on the shaft 57 is a gear wheel 60 which meshes with a gear 61 formed integrally with an upwardly facing beveled gear 62. Mounted on a vertical shaft 63, which is revolubly carried by the arm 59 and has an extended lower end on which a similar beveled gear 62′ is mounted; the gears 62—62′ in turn meshing with beveled gears 64—64′. The gears 64—64′ are provided with an extended hub portion 65—65′ having peripheral channels 66—66′ therein and are adapted for revolubly seating within bearing portions 67—67′ of the bracket 26, and have central bores 68 within which the upper and lower slide members 69—70 of horizontally split cores 71 may operate; the said cores 71 being extended outwardly from the bores of the gears at their forward ends to provide hubs 72 about which the baling wires may be looped during the tying operation and at the opposite ends project within bearings 73 supported by the bracket 26 and wherein the upper core members 69 are secured to prevent the core parts from rotating with the gears 64—64′.

The shaft 57 also carries spaced wheels 75 each having upper and lower cam channels 76—77 therein, and which are located in proper alinement that the slide members of the cores 71 may be operated thereby.

With this arrangement it will be seen that as the shaft 57 is revolved the bevel gears 62—62′ are revolved by the gear 60, and in turn revolve the gears 64—64′, and the cam wheels 75 are simultaneously revolved to operate the core members of the gears 64—64′.

As the construction and operation of both tying sets is identical, except that the parts of the lower set are in inverted relation to those of the upper set, I will proceed to describe but one set with the understanding that the description relates equally to both.

As before stated, as the needle is drawn outwardly from the case after a wire strand has been drawn through the case to inclose a bale the primary strand and the end of the severed secondary strand are held in a clutch 46; the end of the primary strand for an oncoming bale being held in a clutch 20.

The clutches 46 are placed slightly above the horizontal line of the upper core member, so that wires carried in by a needle may be placed over the core portion and gripped by the clutch as the needle passes.

Referring particularly to Figs. VIII—XI to XVI inclusive, I will now describe the tying operation.

As the needle is withdrawn from the case leaving the strands inclosing a bale clamped in a clutch 46, a movement of the shuttle mechanism following that which operates the needle revolves the shaft 54 to actuate the tying parts; the tying operation in each instance following immediately after each intermittent movement of the needle.

As the shaft 57 revolves, the gear 64 is simultaneously revolved in the direction indicated by the arrow Fig. XI and the wires gripped in the clutch 46 are wrapped about the extended hub portion of the core 71.

The bevel gears 62 and 64 are so proportioned relative to the driving gear 60 that they make two complete revolutions for each single revolution of the driving gear and will terminate their travel at their initial position, and the shuttle, and mechanism intermediate the shuttle and tying parts, is so geared that but one revolution is given the drive shaft 57 to complete a tying operation.

After the strands have been carried once around the hub 72, the lower core portion 70, which has heretofore remained stationary, is drawn inwardly within the hub bore; this being done by the revolution of the cam wheel 75, which operates the lower portion 70 of the core by means of a connecting arm 80, that overlies the face of the cam and carries a roller 81, which seats within the cam channel 77, and is adapted for rolling engagement with the side faces thereof. The channel 77, the greater part of its length, is concentric with the wheel axle, but has an offset portion 82 drawn toward the center of the wheel which causes the inward movement and a following outward movement of the core member 70 as the roller passes therethrough.

As the gear 64 continues to revolve the ends of the strands are drawn about the upper core member 69, over the inner face thereof, to lie transversely across the core bore (Figs. XII—XIII), and on the outer side of the lower circumference of the loop formed by the first revolution of the gear; the lower portion of the loop being drawn inwardly with the indrawing of the core member 70.

After the wires have been looped about the core hub 72, and drawn across the bore as described, the clutch 46 is released to free the strands. This releasing taking place at the proper time relative to the movement of the tying parts and is accomplished by means of a lever mechanism comprising an arm 85, which is pivotally mounted on a stud 86 on the bracket 26 and has a forwardly extended arm 87 having an upward extended portion 88, with an inclined tooth 89 thereon, which is adapted to engage the pin 52 projecting outwardly from the face of the grip head 47, so that as the head is carried forwardly by the gear the stud will ride up the inclined face of the tooth 89 to revolve the clutch head, and release the wires which are gripped thereby. The arm 85 being rocked at the proper time by a cable 90, which connects at one end with an arm 91, on the lever 85 and at its opposite end with a lever 92, which is pivotally mounted on a stud 93 and is so placed that the outer end thereof will be engaged by an upstanding pin 94 on the gear 60 as the latter revolves to rock the lever 92 outwardly to cause a similar movement of the lever 85 to release the clutch.

The clutch releasing lever 85 is normally held out of engagement with the clutch pin 52 by a spring 95 which is secured to a pin 98, and to the lever arm 91 and the arm 85 is limited in its movement between stop pins 96—97.

Simultaneously with the releasing of the strands from the clutch 46 the freed ends of the strands are drawn through the loop formed by winding of the strands about the hub 72 to form a knot. The drawing of the strands through the loop at the proper time being accomplished through the cam mechanism and a link 100, which is slidably retained in a longitudinally extending slot 101 in the upper core member 69; the said link being operated through an extension arm 102 having a roller 103, revolubly mounted at its outer end, which is adapted for rolling engagement within the upper cam channel 76; the channel 76 having an indrawn portion 104 which will cause the link to move inwardly within the core as the roller 103 travels therein.

At the outer end of the link 100 I provide a hook 105, which is pivotally connected therewith and has a hook arm 106, which prior to the indrawing of the core link, projects slightly beyond the face of the hub 72.

After the strands have been looped about the hub and the lower core portion drawn inwardly to allow the strands to be drawn transversely across the loop the strands are released from the clutch 46, and the ends drawn through the loop by the inward movement of the link 100 which causes the hook arm 106 to catch the loose ends and draw the same through the loop to form a knot which secures the two strands together.

As the cam wheel 75 continues to revolve the link 100 is carried outwardly and the outer face of the hook arm 106 engages the looped strands to unseat the loop from the hub.

In order to prevent the wires from slipping from the hub during a winding operation I provide the lower portion of the core hub with a spring hook 110, having an outwardly projecting tooth 111 thereon; this tooth not only serves to retain the wires on the hub, but also serves, as the core portion 70 moves inwardly, to carry the lower portion of the loop back adjacent the gear face, so that as the ends of the strands are drawn transversely across the gear bore they will pass on the outer side of the loop and are in proper position to be drawn through the loop by the hook 106.

Briefly describing the operation of the apparatus as applied to a hay baler, the tie wires in the storage spools 15 are threaded through the needle points, run across the compression chamber and secured in the clutches 20 at the upper and lower positions relative to the bale. Hay is then fed into the press through the hopper and forced forwardly by the plunger, the compression chamber of the case retarding movement of the hay, so that it is compacted while being formed. As the bale grows and moves forwardly it operates the shuttle mechanism to drive the needles transversely across and back of the bale. As the wires were located transversely of the baling chamber and in the path of a bale, the wires have been drawn out by the bale being pushed thereagainst, so that they inclose both sides and front end thereof. As the needle is driven across the baling chamber it carries the wires that are to inclose the rear end of the bale and also carries the wire strands between the clutch members of the looping gears and clamps the same therein, final movement of the needle points bringing the cutting blades together to sever the wire and actuate a clutch to grip the end of the severed strand.

As the wires have been gripped in clutches as described, the ends of the wires are held, so that they form strands across the baling chamber against which an oncoming bale may abut; the former end strands being clamped in a clutch on the tying gears. After the needles have been actuated the tying gears are operated through the shafts 54 and 57 to loop and knot the ends of the bale strands as previously described. The driving gear 56 makes but one revolution and all the parts are returned to normal or initial position, and ready for a successive operation as a new bale is formed.

The operation is continuous, however, so that the hay may be fed to the press without interruption.

Having thus described my invention what I claim as new therein and desire to secure by Letters-Patent, is:—

1. The combination with a baling case, of means at one side for rigidly holding the primary end of a wire, means loosely holding the wire at the opposite side of the case to permit its feed by advancing material, the last named means being movable to carry the wire across the case, means for severing the carried over portion of the wire, a clutch for gripping the primary strand and an end of the severed strand, means for looping the strands, means for releasing the gripped ends of the strands after the loop has been formed, and means for drawing said ends through the loop to tie the strands together.

2. The combination with a baling case having means at one side thereof for carrying baling wires transversely through the case, of a tying mechanism comprising revoluble gears having extended hub portions, clutches on said gears for gripping the opposite ends of baling wires, means for revolving the gears to loop the said wires about the said hubs, and means operable through the hubs to draw the ends of the said wires through the loops.

3. The combination with a baling case having means at one side thereof for carrying baling wires transversely through the case, of tying gears, having central bores therethrough, transversely split cores extending through said bores comprising movable and fixed portions, a clutch on each of said gears for holding the ends of a baling strand, gears operable by a prime mover for rotating the tying gears to wind the said strands about the core portions, cam wheels operable by the prime mover for drawing the movable core portion within the gear bores to allow the gripped ends of the strands to be drawn transversely across the looped portion, a latch arm for releasing the wires from the said clutches, a link slidably mounted in the fixed core, a hook at the outer end of said link overlying the ends of said strands, means operatively connected with the said cam wheel for actuating the said link to draw the hook inwardly within the core to draw the ends of said strands through the loops, for the purpose set forth.

4. The combination with a baling case, of means at one side for rigidly holding the primary end of a baling wire, means loosely holding the wire at the opposite side of the case to permit its feed by advancing material, the last named means being movable to carry the wire across the case, means for severing the carried over portion of the wire, a revoluble gear having an extended hub portion, a clutch on said gear for gripping the primary strand and end of the severed strand, means for revolving the gear to loop the gripped strands about the hub portion, means for releasing the gripped strands after the loop has been formed, and means for drawing the said ends through the loop to knot the strands together.

5. The combination with a baling press, of a wire tying mechanism comprising revoluble gears, having central bores therethrough, clutches carried by the gears for holding the ends of baling strands, hub portions extending through the gear bores, means for revolving said gears to loop the bale strands about the hub members, a latch for releasing the strand clutches, a link slidable in the hub member having a hook thereon whereby the released ends of the strands are drawn through the formed loop to knot the said strands together.

6. The combination with a baling press, of a wire tying mechanism comprising a revoluble gear having a central bore therethrough, a split core projected through said bore, comprising upper and lower members, a clutch on said gear adapted for gripping the opposite ends of a baling strand, means for revolving the gear to wrap the gripped strands about the said core to form a loop, a cam wheel operatively connected with a core member to draw the same within the gear bore to allow the ends of the strands to be drawn across the looped portions, means for releasing the strands from the clutch, and a hook arm operated by the said cam wheel to draw the released strand ends through the loop.

7. The combination with a baling case, of a clutch comprising an eccentrically mounted gripping head adapted for movement toward and from a fixed head, a stud projecting from the eccentrically mounted head, and a needle for carrying a wire to the clutch, having an inclined surface adapted for engaging the clutch stud to rock the head to effect a grip on the wire.

8. The combination with a baling case, of a clutch comprising an eccentrically mounted gripping head adapted for movement toward and from a fixed head, a stud projecting from the eccentrically mounted head, and a releasing arm having an inturned head portion, and an inclined face, means for rocking the arm to cause the inclined face of said head to engage the clutch stud to again rock the grip head in an opposite direction to release the wire.

In testimony whereof I affix my signature.

EDWARD G. PADDECK.

Copies of this patent may be obtained for five cents each, by addressing the "Commissioner of Patents, Washington, D. C."